Jan. 1, 1935. A. P. TRUFANT 1,986,033
CLOSE REAR VISION REFLECTOR FOR AUTOMOBILES AND THE LIKE
Filed March 19, 1931   2 Sheets-Sheet 2
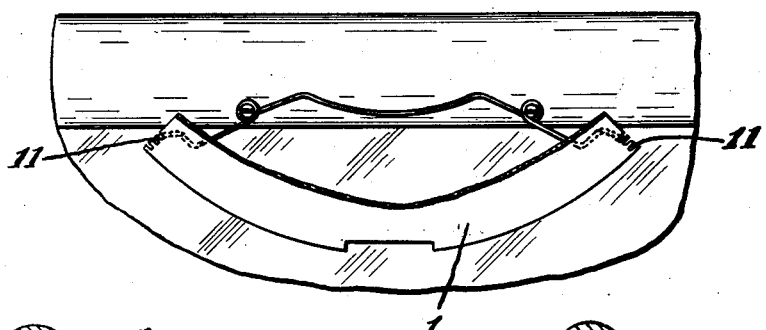
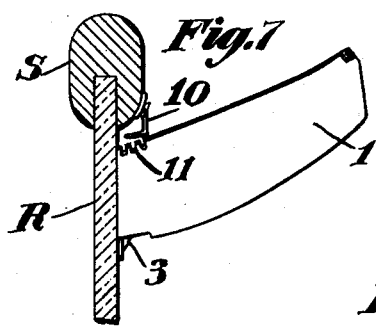
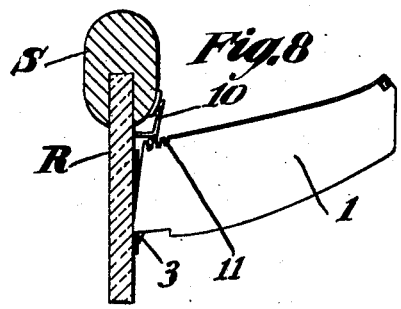
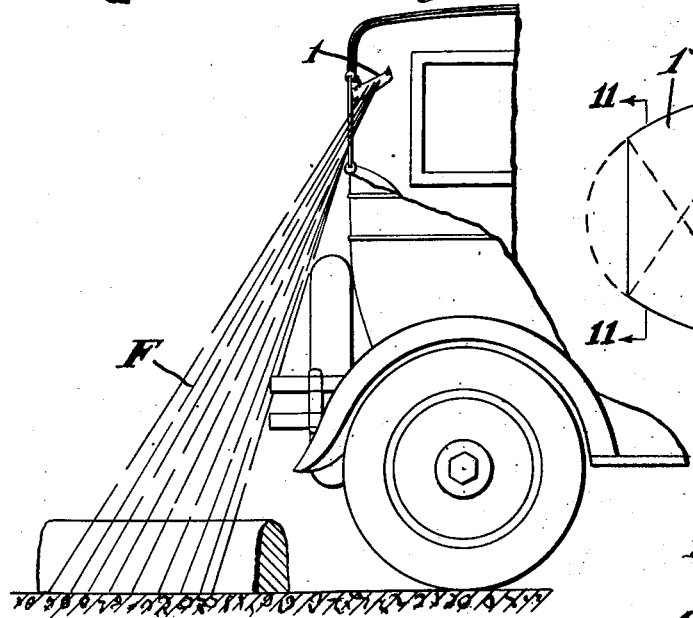
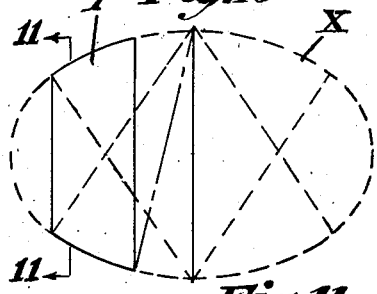
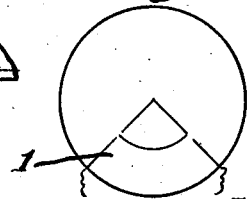
Inventor
Alton P. Trufant
By Attorney Patented Jan. 1, 1935

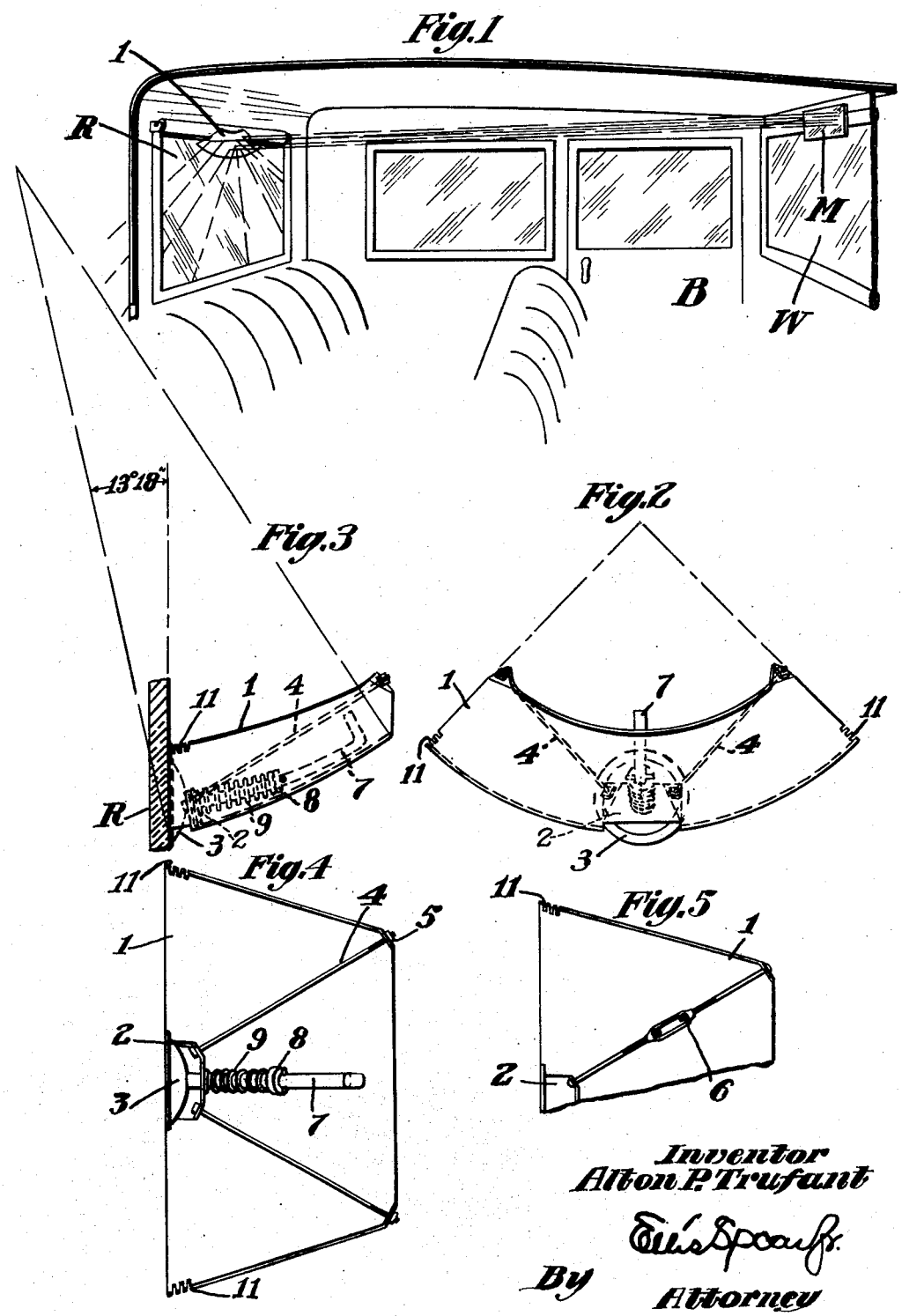

1,986,033

UNITED STATES PATENT OFFICE 1,986,033

CLOSE REAR VISION REFLECTOR FOR AUTOMOBILES AND THE LIKE

Alton P. Trufant, Whitman, Mass.

Application March 19, 1931, Serial No. 523,690

14 Claims. (Cl. 88—1)

In observation systems it is frequently important to observe areas in obscured, close angled relation to the observer. While useful in all sorts of places, a characteristic instance is that of the automobile driver who from a front seat position needs to observe obstacles at the rear end of his vehicle and in such position as to be out of sight either by rear or side observation.

Taking such a case as the above and noting particularly the difficulties as instanced with an enclosed car, I will discuss my invention in terms applicable to such an example.

The problem in such a case is that of wide angle and close up rear vision. Present conditions require for safety a comprehensive rear view at the back or rear end of the car, as for example, close to the rear wheels or mud guards or bumper.

I have therefore shown in the accompanying drawings as an illustrative embodiment a reflector and a characteristic installation in an automobile. In the drawings:

Fig. 1 is a partial interior view of an automobile body showing such an installation.

Fig. 2 a view of the rear reflector from the front.

Fig. 3 a side view of the same.

Fig. 4 is a plan view of such rear reflector.

Fig. 5 a fragmentary plan view showing a modified form of mirror adjustment means.

Fig. 6 is a view from the front showing a modified form of adjusting the mirror.

Fig. 7 a side view of the same in one adjustment.

Fig. 8 a similar view showing another adjustment.

Fig. 9 indicates the field of vision at the rear of the car.

Fig. 10 is a diagrammatic analysis of the curvature of the rear reflector as to major axis, and Fig. 11 a similar analysis as to its minor axis.

Referring to the installation as shown in Fig. 1, I have indicated at B the general interior of a body of an enclosed automobile having the windshield W and rear window R and front mirror M, such as is usually installed in automobiles for general rear vision. At the rear of the car is installed my reflector 1 located at the upper part of and inside of the rear window R, its disposition being also indicated in Fig. 9. In this latter figure I have also indicated by the dotted lines F the general field of vision made possible by my reflector 1.

The reflector 1 as shown in Figs. 2 to 4 is provided with a transverse plate 2 in which is mounted a suction cup 3 for holding the reflector 1 in position on the window. The reflector 1 is braced by the rods 4 these being adjustable by the nuts 5 to tension the member 1 and give it the desired curvature or adjustment. As shown in Fig. 5, this may also be accomplished by a turn buckle 6. The suction cup 3 is mounted on a stem 7 passed through the plate 2 the stem 7 being provided with a collar 8. Between the collar 8 and the plate 2 I interpose a spring 9 for yieldingly holding the reflector 1 in its position against the window or other part on which it is mounted. As illustrated in Fig. 7, I have shown a form of adjustment for the reflector 1 by a bracket 10 attached to the sash S or other portion of the car adjacent the window R. In this form the reflector 1 is adjustable relative to the bracket 10 by notches 11, two positions of adjustment being shown in Figs. 7 and 8. This permits the reflector 1 to be so positioned as to give the desired field of vision F at the rear of the car and at the same time hold alignment with the mirror M in front of the driver.

The reflection of any such field as that close to the rear of a car or in other places where such an angle is involved, presents various difficulties as it is of course important that such a reflection when observed by the driver in the mirror M must be without undue distortion.

My invention therefore contemplates a curvature for the reflector 1 or a curved surface on such a reflector and while the figure of this surface may be somewhat varied it preferably should be or very closely approximate a zone of a prolate spheroid defined by planes at right angles to the major axis of the spheroid.

Referring to the diagrammatic illustration of Fig. 10 I have indicated at 1 the general outline of the zone of the reflector carrying out in the broken lines X the full outline of the spheroid of which the reflector 1 represents a zone or partial zone.

In Fig. 11 I have also indicated at 1 the rear reflector in its relation to an end view of such a spheroid showing the minor axis of curvature of such a figure. The form of reflector 1 shown in Fig. 11 is of particular advantage with the angle between the broken lines at 90° as shown. This gives to the sides of the reflector such an angle that the image of lines, as for example, curbstones or lane markings when parallel to the longitudinal viewing axis appear when viewed adjacent the edges of the mirror as being parallel thereto. It is therefore possible to observe with great accuracy the relation of a car to the curb, a lane line or another car by simply guiding on the relation of the line of the image to the edge of the mirror.

I preferably make my reflector member 1 of very thin metal capable of taking and retaining high polish. The reflector is pressed to shape but on account of the desirability of saving weight by using thin metal, my adjustable strut rods 4 or 6 are important in maintaining the shape or restoring it if the reflector becomes warped.

For some purposes it may be desired to change or adjust the curvature of the reflector and this may also be accomplished through the strut rods.

My reflector may be variously mounted according to the location in which it is to be mounted. In use in an automobile the position will vary with the construction and equipment of the car especially as to the size and shape of the rear window, the location of the curtain and other parts which differ in different makes of cars.

In such an installation as that shown in the drawings and with a reflector of such a figure the reflector would be positioned as nearly as possible as indicated in Fig. 3. In that position it will be noted that the center for the major radius of curvature of the reflector lies at an angle of 13° and 18 min. from the plane of the window R when vertical, the reflector being arranged symmetrically with reference to a vertical plane perpendicular to the window.

In such a position a maximum field according to usual desires and requirements is secured. The light falling on the surface of the reflector at variant angles give the images at the rear of the car and being then reflected in parallel rays as a beam directed towards the front mirror M in which the details of the view at the rear of the car may be observed. In this way the driver can see to the immediate rear of the car thus affording protection backing up or in parking alongside a curb or closely adjacent to any object and is of particular importance in the avoidance of accidents to pedestrians who may step suddenly behind the car at a moment when the driver is intending to back.

As before stated, my reflector and reflecting system may be put to all sorts of uses besides that of in automobiles. These are too numerous to catalog, or illustrate, but the principles involved are the same, as for example, where an attendant in a bank, store or office can by having a mirror such as M properly located look to the rear and angularly as around a corner without changing position.

While I have shown a rubber suction cup as a convenient standard method of attaching my rear reflector, it may, of course, be mounted in any way and in fact be made a permanent installation by attaching in any suitable manner.

Whether permanently installed or mounted as shown in the drawings, the position of the wheels or other parts of the car relative to any object such as a curb, can be readily judged by the driver by the position of the image in the mirror. While the installation within the car and inside the rear window is convenient and advantageous, my rear reflector may be positioned at any desired point inside or outside of a car or truck or in any other place or location.

What I therefore claim and desire to secure by Letters Patent is:—

1. A mirror of wide angle reception and substantially parallel reflection, especially for use in reflective alinement with a viewing mirror, comprising a reflecting body of flexible material convexly curved both longitudinally and transversely, and means connecting different portions of said mirror and adjustable as to effective length to vary the curvature of the mirror.

2. A mirror of wide angle reception and substantially parallel reflection, especially for use in reflective alinement with a viewing mirror, comprising a reflecting body of flexible material convexly curved both longitudinally and transversely, and rods connecting different portions of said mirror and adjustable as to effective length to vary the curvature of the mirror.

3. A mirror of wide angle reception and substantially parallel reflection, especially for use in reflective alinement with a viewing mirror, comprising a reflecting body of flexible material convexly curved both longitudinally and transversely, and means connecting marginal portions of said mirror with medial portions thereof and adjustable as to effective length to vary the curvature of the mirror.

4. A mirror of wide angle reception and substantially parallel reflection, especially for use in reflective alinement with a viewing mirror, comprising a reflecting body of flexible material convexly curved both longitudinally and transversely, and a pair of rods connecting forward corner portions of said mirror with a medial rear portion thereof and adjustable as to effective length to vary the curvature of the mirror.

5. A mirror of wide angle reception and substantially parallel reflection, especially for use in reflective alinement with a viewing mirror, comprising a reflecting body of flexible material convexly curved both longitudinally and transversely, and means for varying the curvature of said mirror, said means comprising a member rigid with the mirror near the rear and medially thereof, and rods adjustable as to effective length connecting front corner portions of the mirror with said member.

6. A mirror of wide angle reception and substantially parallel reflection especially for use in reflective alignment with a viewing mirror and having a convex surface of sectional prolate spheroidal figure comprising approximately a quarter zone defined by planes at substantially right angles to the major axis of the spheroid and having its lateral edges defined by lines included in planes radial to the major axis and at substantially right angles to each other whereby the lines of images parallel to the reflective alignment will be observed apparently parallel to the mirror edge when reflected adjacent thereto.

7. In an observing system for automobiles and the like, a mirror of wide angle reception and substantially parallel reflection, means for mounting it adjacent the top of a window interior, a viewing mirror observationally aligned therewith, said wide angle reception mirror having a convex surface of an approximately prolate spheroidal figure comprising a quarter of a zone of a prolate spheroidal surface, said zone being defined by planes at right angles to the major axis of the spheroid, the major axis of the convex mirror being disposed longitudinally of the viewing system and substantially perpendicular to the window whereby images of the areas immediately opposite and laterally thereof are reflectively observable.

8. In an observing system for automobiles and the like, a mirror of wide angle reception and substantially parallel reflection, means for mounting it adjacent a window interior, a viewing mirror observationally aligned therewith, said wide angle reception mirror having a convex surface of major and minor curvature with its major axis disposed longitudinally of the viewing system and substantially perpendicular to the window whereby images of the areas immediately opposite and laterally thereof are reflectively observable.

9. A mirror as claimed in claim 5 and including a rod yieldingly mounted in relation to said rigid member, said yieldable mounting including a spring normally under compression interposed between a stop on said rod and said rigid member and means on said rod for mounting the mirror on a support.

10. A mirror of wide angle reception and substantially parallel reflection, especially for use in reflective alinement with a viewing mirror, comprising a reflecting body of flexible material convexly curved both longitudinally and transversely, and means for varying the curvature of said mirror, said means comprising a member rigid with the mirror near the rear and medially thereof, and rods adjustable as to effective length connecting front corner portions of the mirror with said member, a rod yieldingly mounted in relation to said rigid member, said yieldable mounting including a spring normally under compression interposed between a stop on said rod and said rigid member and means on said rod for mounting the mirror on a support, and means for bodily adjusting the mirror relative to said support to vary the reflected image longitudinally and to the rear of the automobile.

11. The mirror described in claim 10, wherein the means last referred to therein includes a series of notches in opposite edges of the mirror and an independent cooperating member therefor adapted selectively to engage the notches for different adjusted positions of the mirror whereby a plurality of independent adjusting means are provided one to vary the reflected area transversely of the automobile and the other to vary the reflected image longitudinally of the automobile, said plural adjusting means being operable independently of the mounting means for the mirror.

12. A mirror as claimed in claim 5 and including a rod yieldingly mounted in relation to said rigid member, said yieldable mounting including a spring normally under compression interposed between a stop on said rod and said rigid member and means on said rod including a suction cup for mounting the mirror on a support, whereby the cooperative action of the compression spring and the suction cup minimizes vibration of the mirror.

13. A mirror of wide angle reception and substantially parallel reflection, especially for use in reflective alinement with a viewing mirror, having a convex surface of sectional spheroidal figure comprising approximately a quarter zone defined by planes at substantially right angles to the major axis of the spheroid and having its lateral edges defined by lines included in planes approximately radial to the major axis and at approximately right angles to each other whereby the lines of images parallel to the reflective alinement will be observed apparently parallel with the mirror edge when reflected adjacent thereto.

14. In an observing system for automobiles and the like, a mirror of wide angle reception and substantially parallel reflection, means for mounting it adjacent the top of a window interior, a viewing mirror observationally alined therewith, said wide angle reception mirror having a convex surface of an approximately spheroidal figure comprising substantially a quarter of a zone of a spheroidal surface, said zone being defined by planes at about right angles to the axis of the spheroid, the axis of the convex mirror being disposed longitudinally of the viewing system and substantially normal to the window whereby images of the areas immediately opposite and laterally thereof are reflectively observable.

ALTON P. TRUFANT.